Aug. 14, 1923.  
W. G. ALLAN  
1,464,840  
ELECTROLYTIC APPARATUS  
Filed Sept. 13, 1920  
9 Sheets-Sheet 7

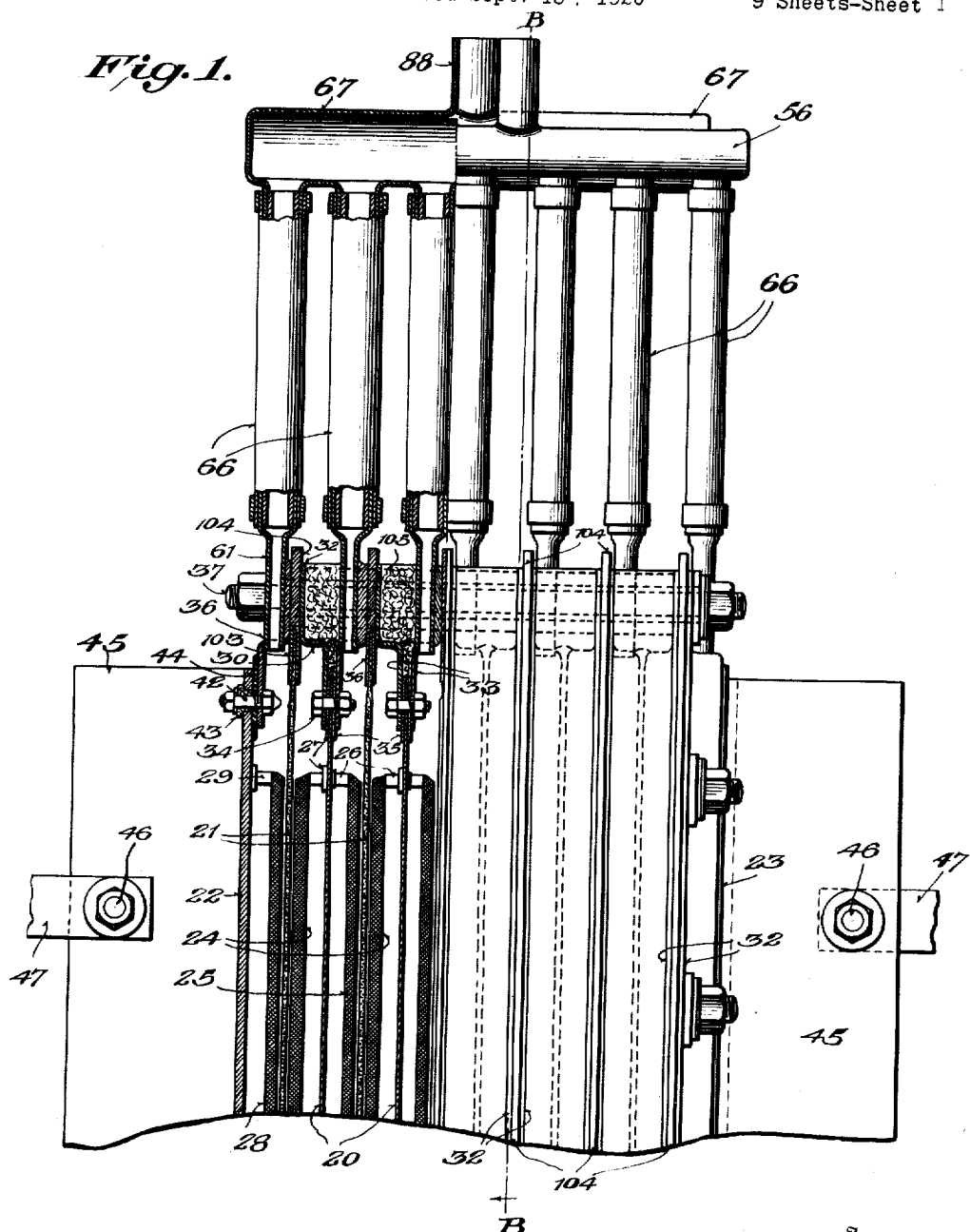

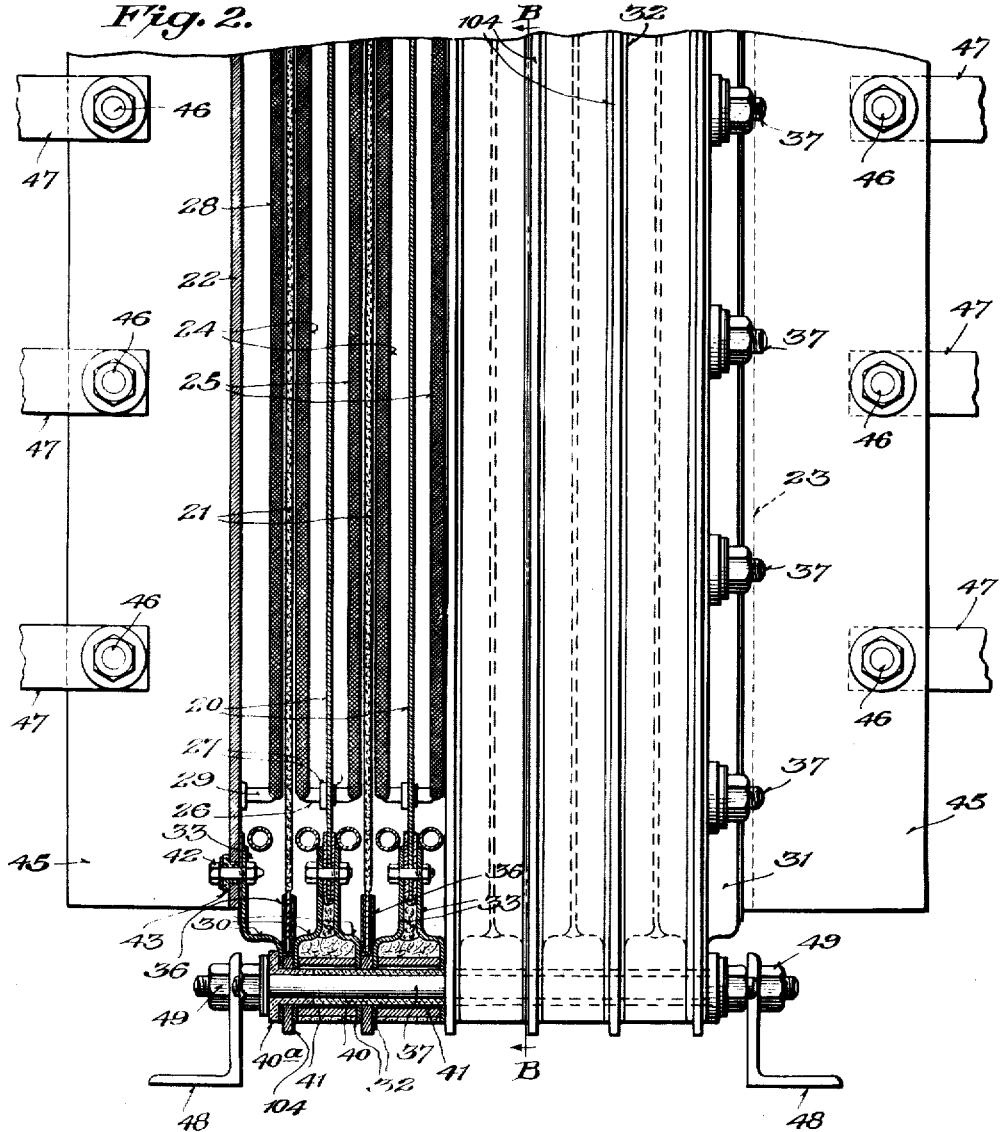

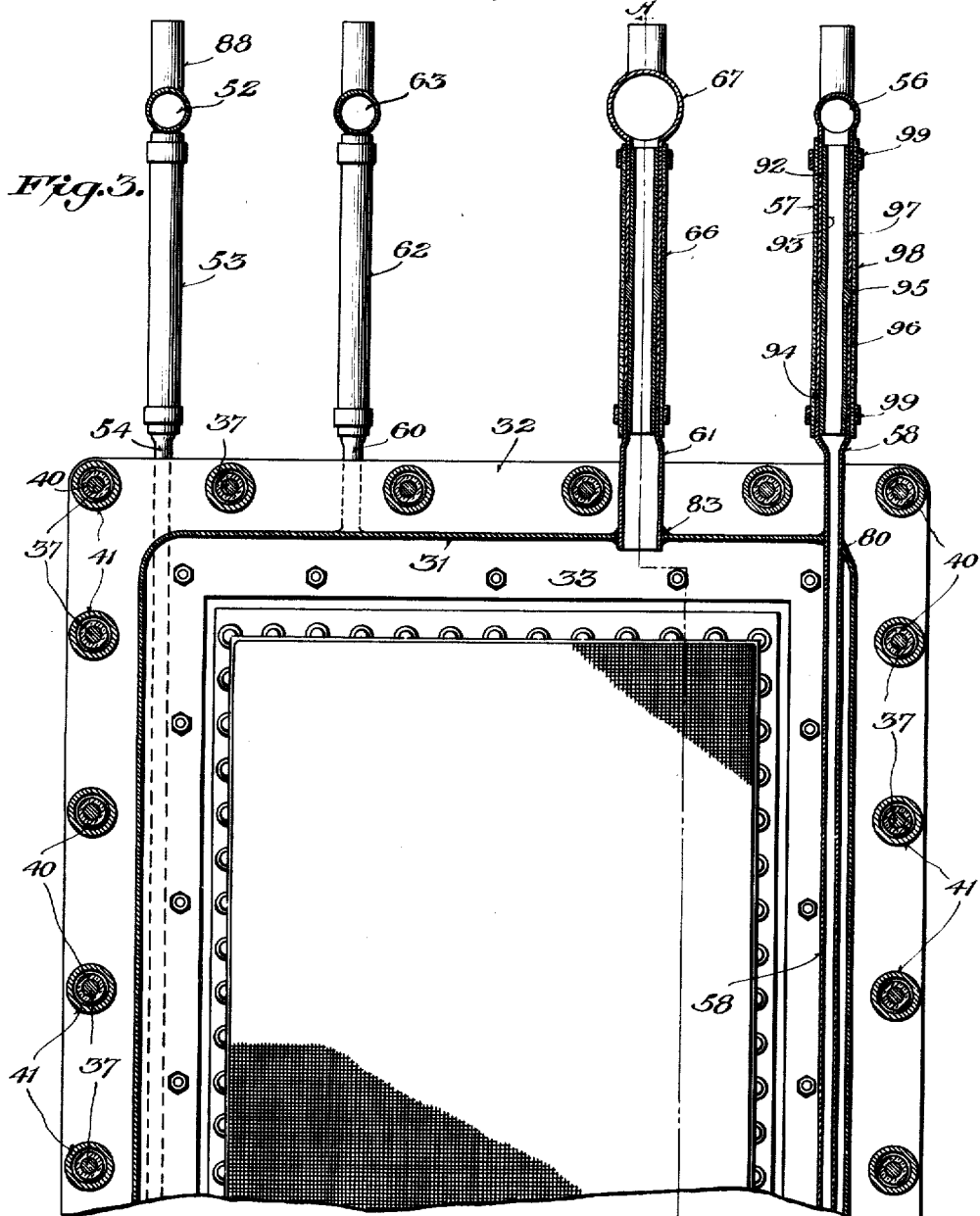

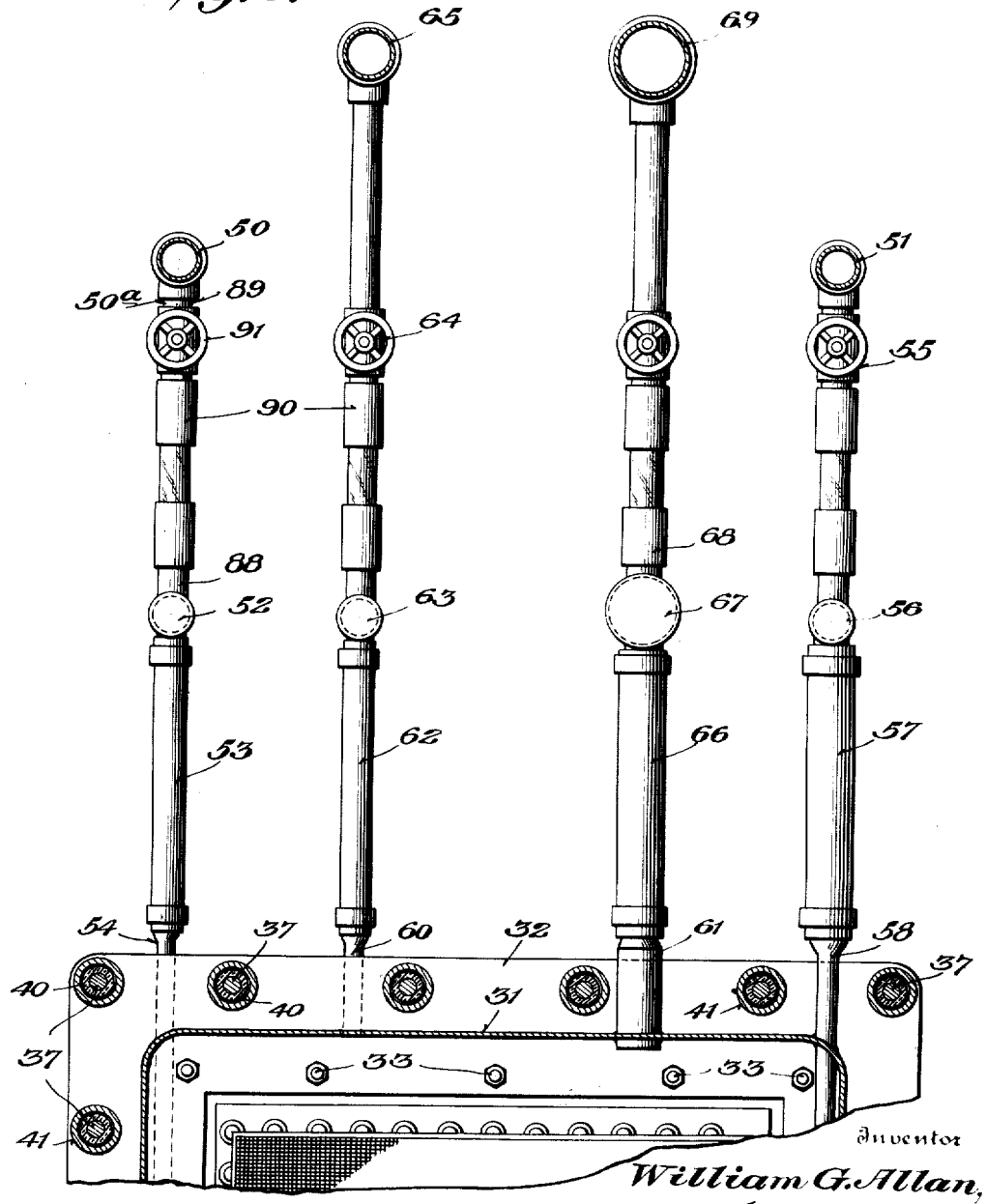

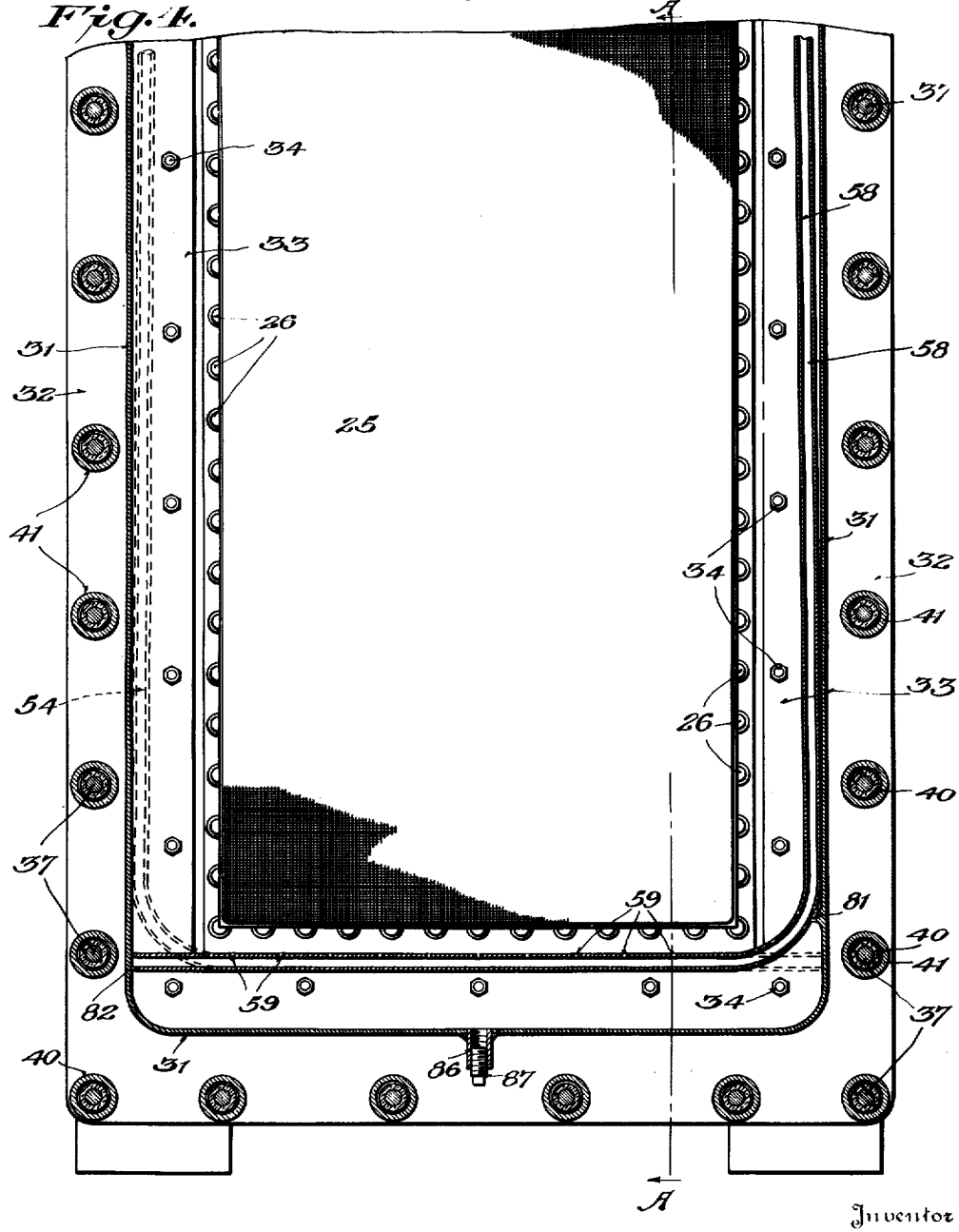

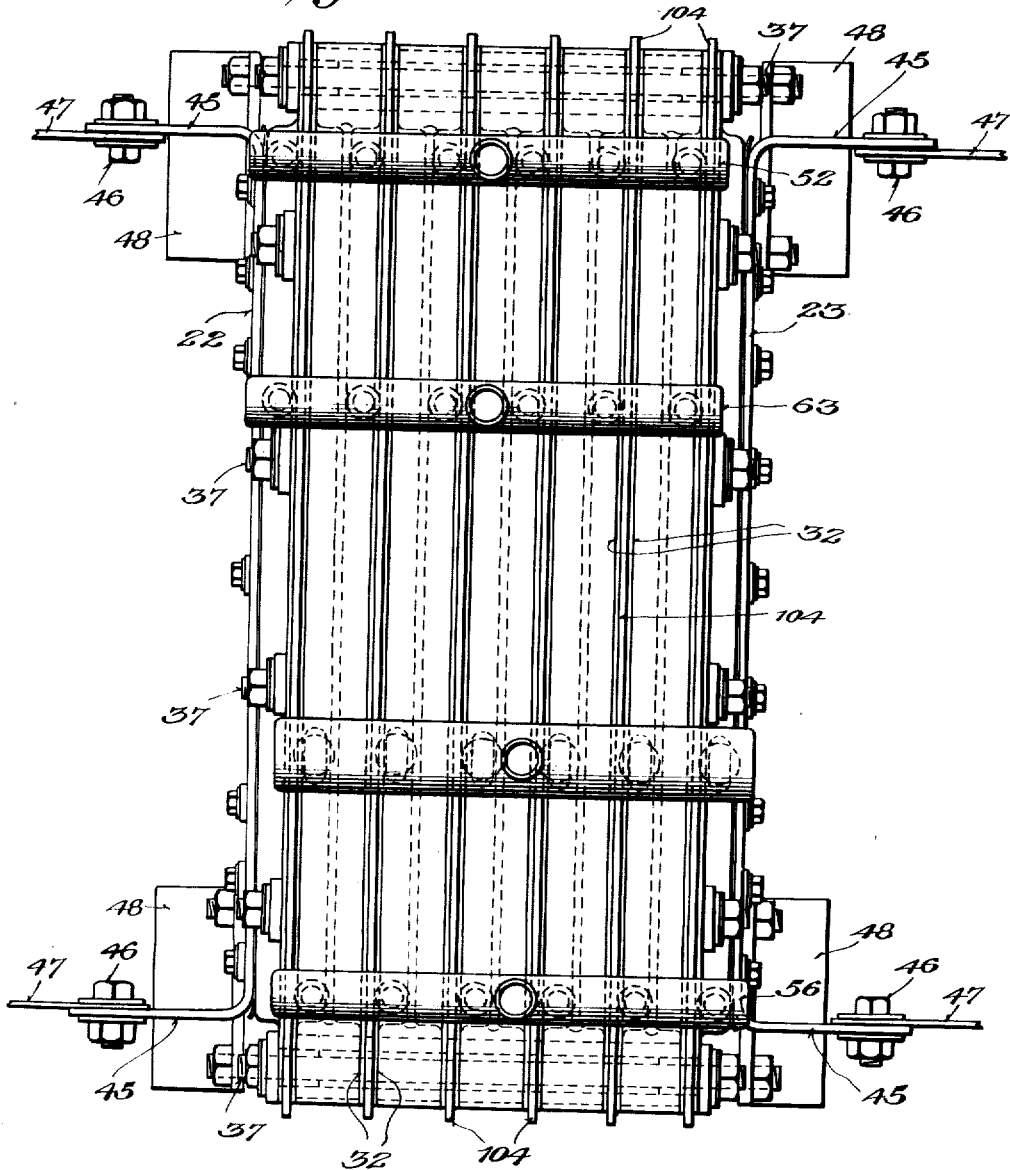

William G. Allan,

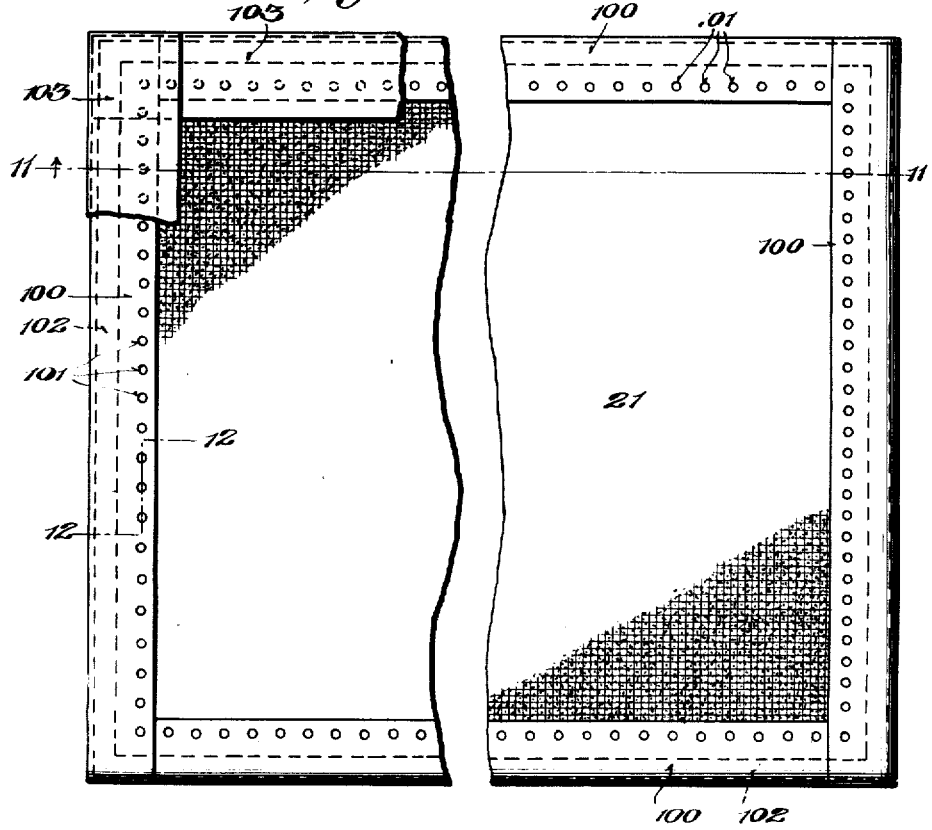
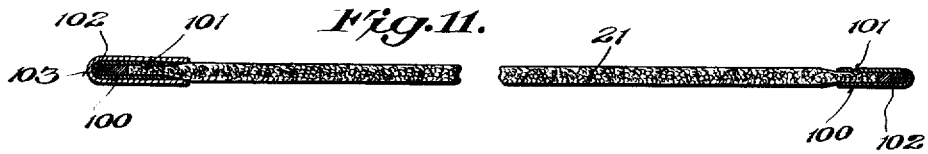

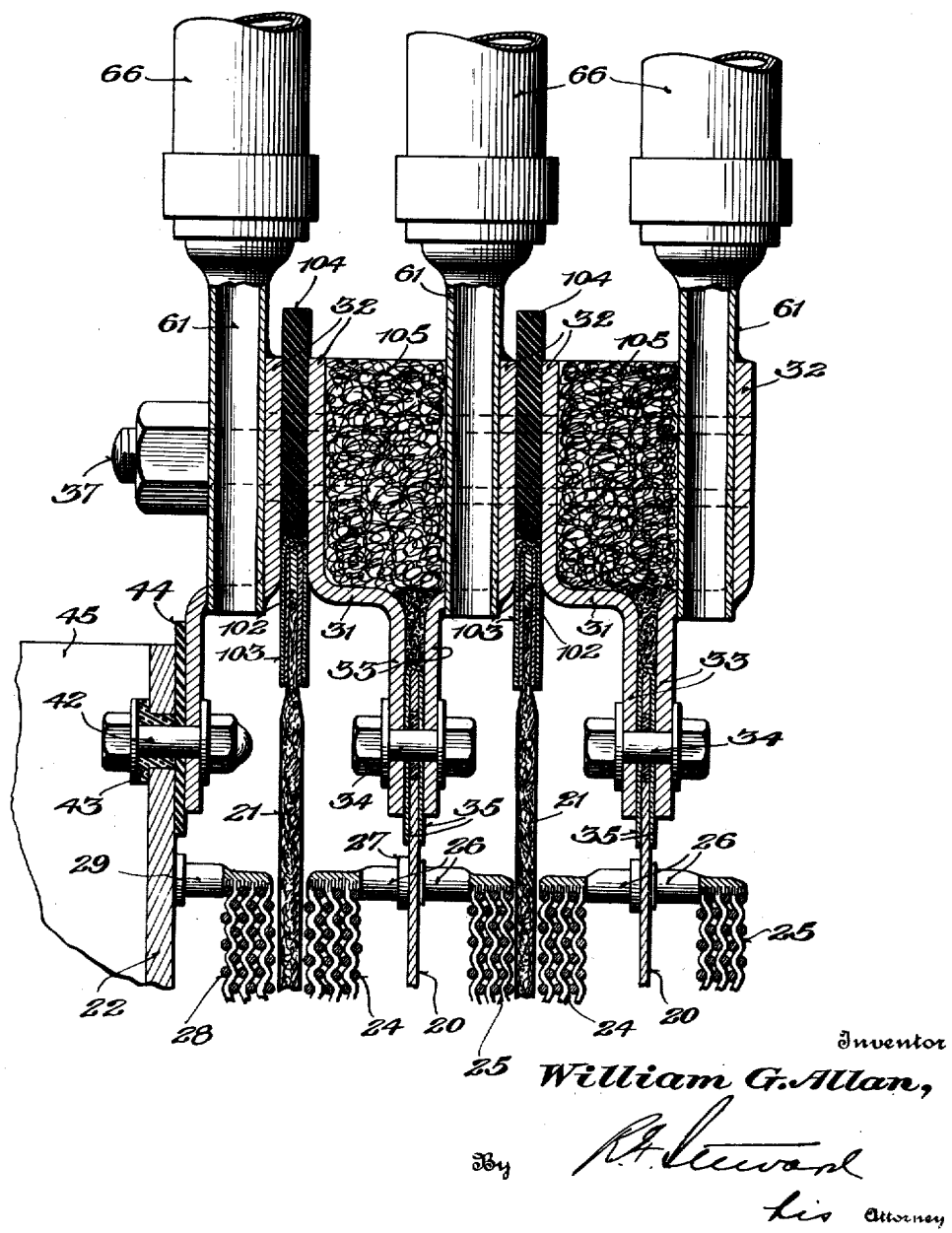

Patented Aug. 14, 1923.

1,464,840

UNITED STATES PATENT OFFICE.

WILLIAM G. ALLAN, OF TORONTO, ONTARIO, CANADA, ASSIGNOR TO THE TORONTO POWER COMPANY, LIMITED, OF TORONTO, CANADA, A CORPORATION OF ONTARIO, CANADA.

ELECTROLYTIC APPARATUS.

Application filed September 13, 1920. Serial No. 409,899.

*To all whom it may concern:*

Be it known that I, WILLIAM G. ALLAN, a subject of the King of Great Britain, residing at Toronto, county of York, Province of Ontario, Canada, have invented certain new and useful Improvements in Electrolytic Apparatus; and I do hereby declare the following to be a full, clear, and exact description of the invention, such as will enable others skilled in the art to which it appertains to make and use the same.

This invention relates to electrolytic apparatus, more particularly apparatus for electrolytic production of oxygen and hydrogen from water containing an electrolyte such as an alkali or an acid.

The general object of the invention is to improve, simplify, and render more efficient apparatus of the character in question, and more particularly electrolytic gas generators wherein a plurality of cells are electrically connected in series and are assembled structurally into one or more units.

A more specific object of the invention is to provide a novel form of casing member whereby the component cell walls or partitions and diaphragms included in a generator unit may be conveniently assembled and maintained in proper relation one to another.

Another object of the invention is to provide a diaphragm construction of such character and arrangement that capillary leakage of electrolyte to the exterior of the cell is substantially prevented.

A further object of the invention is to provide a novel and desirable construction and arrangement of conduits for handling gases and electrolyte in connection with the operation of electrolytic apparatus of the general class in question.

With the above general objects in view, and some others which will appear from the description hereinafter, the invention consists in the features, details of construction, and combination of parts, which will first be described in connection with the typical practical construction shown in the accompanying drawings as an illustrative embodiment of the principles of the invention, and will then be more particularly pointed out.

In the accompanying drawings—

Figs. 1 and 2 taken together, show a complete generator unit in side elevation and partly in section on the line A—A of Figs. 3 and 4;

Figs. 3 and 4, taken together, show a section taken at right angles to Figs. 1 and 2 on the line B—B of Figs. 1 and 2 through one of the component cells of the generator unit, parts being shown in elevation;

Fig. 3ª is an end view of piping above the generator unit, and is to be read in connection with Figs. 3 and 4;

Fig. 5 is a top plan view of the generator unit;

Fig. 10 is a view in elevation partly broken away, of an improved diaphragm construction;

Fig. 11 is a transverse section of the same;

Fig. 12 is a fragmentary view on an enlarged scale illustrating the construction of the diaphragm border, in section on the line 12—12 of Fig. 10, and Fig. 13 is a sectional detail on a larger scale illustrating the manner of clamping a diaphragm margin between a pair of casing members.

Figure 6:
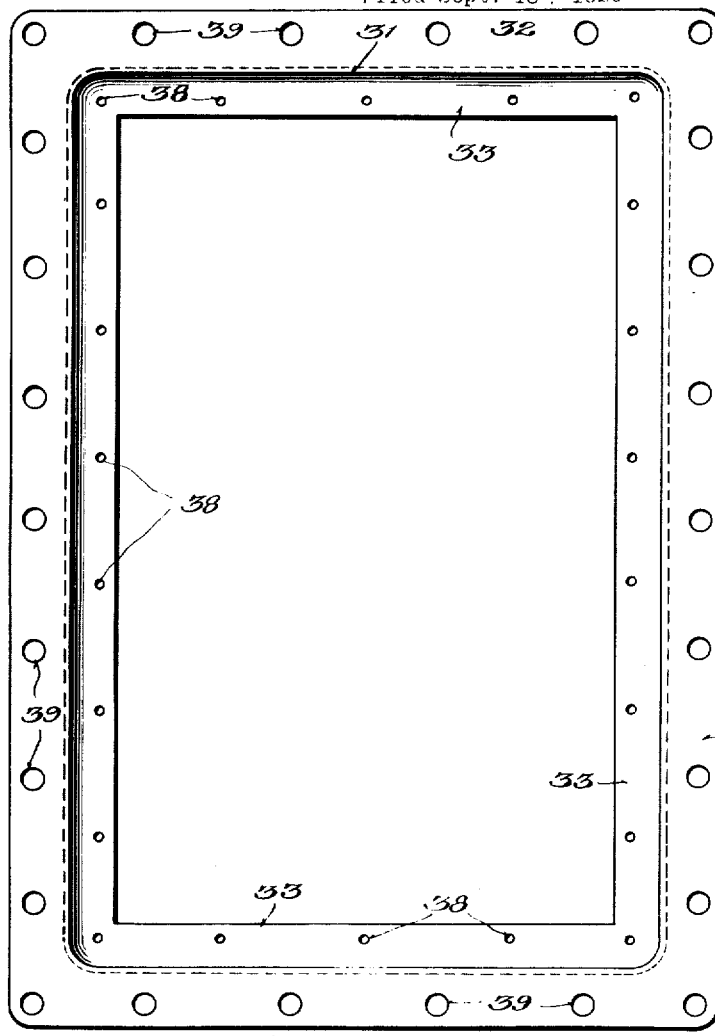
Fig. 6 is a view in elevation of one of the double flanged frames or casing members.

Referring to the drawings, 20 are cell walls or partitions, which are of thin sheet steel in this instance, alternating with porous diaphragms 21, the space between any two adjacent cell walls 20 constituting a single cell, divided by the interposed diaphragm into an anode chamber and a cathode chamber. Said cell walls or partitions may be of non-conducting material, if desired. Any convenient number of cells may be grouped together in series to constitute a structural unit and in the particular unit here illustrated, there are six such cells, four of them being included between successive pairs of the partition walls 20, and the other two being included between the end walls 22, 23 and the respective cooperating adjacent partition walls 20.

Each of the intermediate cell walls or partitions 20 constitutes an electrode support and, as here shown, carries a bipolar electrode structure comprising two active electrode members 24, 25, secured in any suitable manner to said cell walls. In the particular example illustrated, each of said electrode members 24, 25, is foraminous and consists of metallic wire cloth or screen mounted on supporting studs 26 that space the active electrode member away from the cell wall and hold it substantially in engagement with the cooperating diaphragm 21, said studs extending through the cell wall and being secured in place thereon by means of anchoring shoulders 27. One method of securing the wire fabric member to said studs is by welding, but any other appropriate method may be employed. The particular character and construction of the electrodes in question form no part of the present invention, which contemplates the employment of any suitable type of electrodes. The end plates 22, 23, support unipolar electrodes 28 which are suitably mounted upon and secured to said end plates by means of studs 29, the arrangement being similar in essential respects to that already described for the bipolar electrodes.

Figure 7:
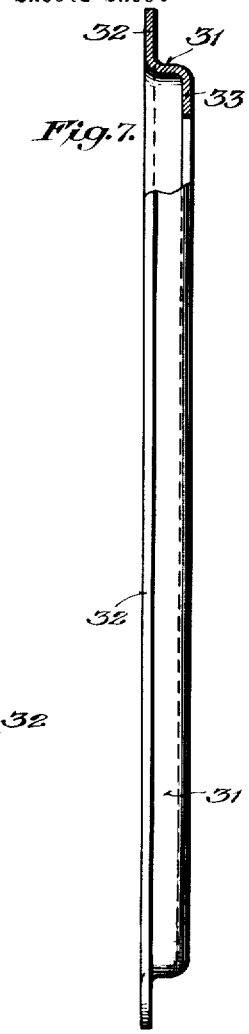
Fig. 7 is an edge view of the same, partly broken away and in section.

In order to support and maintain the described cell walls and diaphragms in proper relative position, and at the same time to provide casing means for peripherally enclosing the component cells of the generator unit, I provide annular frames or casing members indicated generally at 30 in Figs. 1 to 4, and illustrated in greater detail in Figs. 6 and 7. Generally described, these annular casing members are provided with two flanges each and are so assembled with the cell walls or partitions and diaphragms that the successive pairs of flanges engage and hold between them in alternating arrangement the margins of said cell walls and said diaphragms. Within the broad scope of the invention, these flanges may be formed and arranged in a number of different ways depending upon the particular object sought or advantage to be gained in a given generator construction. The form shown in the present illustrative embodiment, however, has particularly advantageous features and characteristics, rendering it superior to others of which I am aware, and it is therefore considered especially desirable for the purposes of this invention. As here shown, each of said annular casing members is substantially rectangular in shape and consists of an annular body portion 31 which may be broadly termed tubular and which corresponds more or less approximately in axial length to the transverse width or thickness of a single half cell (anode or cathode chamber), that is, to the distance from a diaphragm to the next adjacent cell wall on either side thereof; together with two flanges 32 and 33, which in the present illustration extend outwardly and inwardly, respectively, from said cylindrical portion 31 and substantially at right angles thereto. The non-adjacent faces of said flanges constitute bearing surfaces which, in cooperation with similar bearing surfaces on the flanges of adjacent casing members, are adapted to engage and clamp between them the margins of the alternately disposed cell walls and diaphragms before mentioned. In the particular arrangement here illustrated, the inwardly extending flanges 33 of adjacent casing members serve to support the intermediate cell partitions 20 between them, while cooperating pairs of the outwardly projecting flanges 32 serve to hold the diaphragms in position; but this arrangement, though recommended, may be reversed. Any suitable means for securing the described parts together in the relation specified may be employed. In the construction illustrated in the drawings, a plurality of bolts 34 extend through each cooperating pair of the inner flanges 33 and through the interposed margin of the cell partition 20 to be held thereby, suitable packing 35 such as sheet rubber or the like being provided to render the joint liquid tight and to insulate the plate from the casing. Between each pair of adjacent outer flanges 32 of the casing members is clamped the marginal portion 36 of one of the diaphragms, and a plurality of through bolts 37 extending through said outer flanges and diaphragm margins are provided to clamp the assemblage together under pressure to provide a liquid-tight casing for the generator unit.

The double flanged casing members may be constructed in any suitable manner, but in the specific example illustrated they are formed from a single piece of sheet steel shaped in a die under pressure, and the flanges are provided with suitable apertures 38 and 39 to receive the small bolts 34 and the through bolts 37, respectively. While this method of forming the casing members has improtant practical advantages, they can obviously be made in other ways, as, for example, by employing separate pieces for the side and end members and joining them together to form the complete annular casing member by welding or otherwise. The through bolts 37 are insulated from the casing flanges 32 through which they pass, by insulating sleeves 40 and insulating bushings 40ª. Spacing and thrust collars or ferrules 41, through which the bolts 37 and sleeves 40 also pass, are inserted in the spaces between the flanges 32 of each pair of casing members that support a cell wall 20. These spacing and thrust collars or ferrules serve to support the outer flanges solidly against pressure applied to their bearing faces, so that adjacent outer flanges can be drawn tightly together by means of the through bolts to firmly clamp the interposed margin of a diaphragm structure.

Each of the end plates 22, 23, has a flanged annular casing member secured to it as by means of bolts 42, which are suitably insulated from said plate by insulating bushings 43, and said casing member being insulated from said plate by insulating gasket 44 of rubber or the like. Each said end plate 22, 23 is bent at right angles at each end to provide vertical flanges 45, whereby the unit can be conveniently connected electrically in series with other units at opposite ends thereof with the aid of bolts 46 or the like clamping connecting links or jumpers 47, which are similarly secured to adjacent cell units. The unit may be supported on angular feet or pedestals 48 through which certain of the through bolts 37 may extend, the pedestals being anchored solidly to the end walls of the unit by means of nuts 49 on such through bolts. Any other suitable method of supporting the unit in an upright position may of course be employed.

Appropriate means for conducting electrolyte into and from each cell, and for conducting generated gases therefrom, are provided. In the practical construction here illustrated, all the necessary exterior piping connections for this purpose enter the cell unit at the top, thus entirely doing away with the necessity for locating piping connections below the cells and thus rendering the piping much more readily accessible for all purposes, besides reducing the head of liquid in the welded joints and consequently lessening liability to leaks. As here shown, electrolyte is supplied to the half-cell compartments individually from separate supply headers 50 and 51 for anolyte and catholyte, respectively. From header 50, anolyte passes through a pipe 50* to a manifold 52, a separate anolyte manifold being best provided for each unit. From this manifold, a plurality of branch pipes 53, of which there is one for each anode compartment and therefore a total of six for the generator unit here illustrated, extend downward, each being connected to an anolyte intake 54 entering the upper part of an anode half-cell or compartment. Similarly, the catholyte header 51 is connected by a pipe 55 to catholyte manifold 56, of which there is a separate one for each unit, said manifold being connected by six branch pipes 57 to the catholyte intakes 58 of the respective cathode half-cells or compartments. Each of the anolyte and catholyte intake pipes 54 and 58 extends down to near the bottom of the corresponding half-cell, passing between the inner peripheral wall of the cell and the edge of the active electrode member therein. Most desirably, each intake pipe bends near the bottom of the cell and passes horizontally below and in substantially the same vertical plane as the active electrode member. As here shown, the intake pipe extends horizontally the full width of the cell below and parallel to the lower edge of the electrode member, and is provided on its upper side with openings 59 through which electrolyte may flow upwardly along the faces of the electrode member.

Electrolyte and generated gases leave the upper part of the cell together through offtakes 60 and 61, 60 being the offtakes for anolyte and oxygen from the anode compartments, and 61 being the catholyte and hydrogen offtakes from the cathode compartments. The anolyte and oxygen offtakes 60 discharge through pipes 62 into an offtake manifold 63, from which anolyte and oxygen pass through a pipe 64 to an offtake header 65. Similarly, catholyte and hydrogen pass through pipes 66 into an offtake manifold 67, and thence through a pipe 68 to an offtake header 69. A separate offtake manifold 63 and a separate offtake manifold 67 are provided for each unit in the construction here illustrated. Moreover, the manifold 67 and header 69 are larger than manifold 63 and header 65, because the volume of hydrogen evolved is double that of the oxygen, assuming the pressure and temperature to be the same. For the same reason the pipes 66 are larger than pipes 62; and the flow capacity of the hydrogen offtakes 61 is made greater than that of the oxygen offtakes 60 by increasing the width of each said offtake in a direction parallel to the flanges 32, to form a flattened offtake of which the smaller diameter may be the same as that of the oxygen offtakes. This enables provision of ample offtake capacity even when the cells are relatively very narrow, as in the present example. Both hydrogen and oxygen offtakes are welded or otherwise suitably fixed into the annular body portion 31 of the cell casing members, and in addition may be attached by welding or otherwise to the flanges to obtain structural stiffness or rigidity.

By means of suitable piping connections, anolyte and oxygen on the one hand, and catholyte and hydrogen on the other, are conducted from headers 65 and 69 into the upper part of separate tanks (not shown) for anolyte and catholyte, respectively, where separation of the respective gases from the electrolyte may be effected, and the gases separately led away for use or to gasometers. Anolyte and catholyte, freed from gases in the respective separating tanks, are conducted back through return headers 50 and 51, respectively, to the several anode and cathode chambers through intakes 54 and 58, respectively. Any suitable kind and arrangement of separating tanks operative to effect the foregoing may be employed, and as such systems are well known in the art, broadly speaking, it is unnecessary to illustrate the same here. It will be seen that the offtake headers 65, 69 are located at a somewhat higher level than the return headers 50, 51; they should also enter the respective separating tanks at a higher level than that at which the return headers 50, 51 leave the same. This arrangement facilitates proper and effective circulation of the electrolyte in the system.

Figure 8:
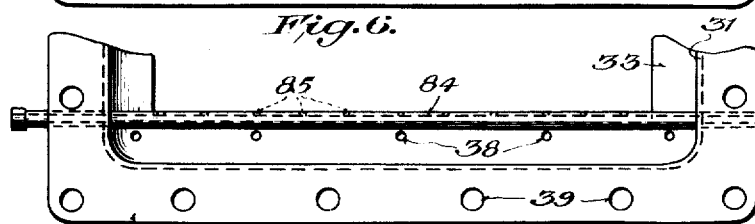
Figs. 8 and 9 are fragmentary views, corresponding to Figs. 6 and 7 respectively, showing a modified construction.
Figure 9:
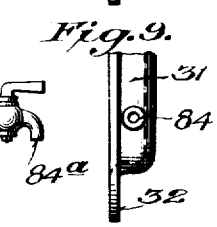

The connections of the described intakes and offtakes to the half cell compartments served thereby may be effected in any suitable manner. In the construction here illustrated, each of the intake pipes 54 and 58, which are similar in all essential respects, passes through the annular body portion 31 of an annular casing member, the joint being most desirably welded as indicated at 80 in Fig. 3, and the pipe also being welded to the adjacent flange 32, as in the case of the offtakes. Most desirably the intake pipe is also brought substantially into engagement with said annular body portion of the casing member on the inner periphery thereof, and is welded thereto (indicated at 81) at about the location where the pipe is bent to extend horizontally across the electrode chamber. In this instance the end of the pipe is also welded to the opposite side of the casing as indicated at 82. Each of the offtake pipes 60 and 61 also enters the corresponding electrode chamber through a suitable opening in the annular body portion 31 of a casing member, the joint being desirably welded in this instance both inside and outside the casing, as indicated at 83. It will thus be seen that each annular casing member is provided with an electrolyte intake and a gas and electrolyte offtake structurally integral therewith in a compact rigid unitary construction. These units may be identical, except that in the particular construction here shown, the catholyte and hydrogen offtakes are larger than the anolyte and oxygen offtakes, as disclosed, because of the relatively larger volume of hydrogen evolved.

Where for any reason it may be convenient or desirable to employ electrolyte intakes or returns entering the cell compartments from below rather than from above, the form of casing member, of which the lower part is illustrated in Figs. 8 and 9, may be used. In this modified construction, the casing member is provided with a pipe 84 having discharge orifices 85 and extending directly through the opposite annular body portions 31 of the casing member near the lower part thereof, one or both ends of said pipe projecting out beyond the edges of the outer flanges 32, thus enabling connection of either end to an intake manifold, the opposite end being closed by a removable plug or a drain cock 84ª, for example. The arrangement in which all the intake and offtake connections enter the upper part of the cells, as first described, has the advantage that such connections are subjected to the pressure of a smaller hydrostatic head than where the connections enter the lower part of the cells.

Each annular casing member may be provided at its lower end with a bottom drain connection 86, normally closed by a plug 87 or other suitable closure means.

In practice it is desirable that the connections of the intakes and offtakes to the manifolds or to the headers, be of such character that in an installation comprising several multi-cell units of the general character hereinabove described, it is possible readily to disconnect any of the units from the rest of the installation and remove the same for repair or replacement, without interrupting or in any way interfering with the operation of the remaining units. The arrangement herein illustrated is especially well adapted to conform to these requirements, the connections being of such character that a unit can be readily and expeditiously disconnected at a location between the above described manifolds and their cooperating headers, or between said manifolds and the cells. It will be seen that the several manifolds and headers are provided with branches 88 and 89 respectively, detachably coupled by flexible couplings 90 such as pieces of rubber hose or the like. The branches 89 are provided with shut-off valves 91 which can be closed when it is desired to disconnect the rubber hose couplings.

It is a matter of great practical importance to provide intake and offtake connections of such character that no continuous metallic path is provided between the conduits 54, 58, 60 and 61 on the one hand, and the respective cooperating manifolds 52, 56, 63 and 67 on the other; and also of such character that a relatively long path be provided from metal to metal, and through which the electrolyte passes. At the same time, it is important that these connections be strong and not readily displaced by pressure of the electrolyte, gases, etc., nor destroyed by chemical action of the electrolyte or products of electrolysis. The novel construction herein illustrated answers these requirements admirably and constitutes an important feature of the present construction. As the constructions for the several intakes and offtakes are essentially similar, it will suffice to describe for purposes of illustration the connection between the intakes 58 and their cooperating manifold 56. The manifold 56, which like the other manifolds may be made of pressed steel, for example, is provided with a plurality of downwardly projecting nipples 92. A tube 93 of relatively hard and rigid insulating material, such as hard rubber for example, fits tightly inside of the nipple 92 and the upwardly extending nipple portion 94 of the intake 58, and is provided intermediate its ends with a shoulder or annular enlargement 95, the outer peripheral surface of the annular shoulder 95 being substantially flush with the outer surfaces of the members 92 and 94. Steel reinforcing tubes 96, 97, disposed on opposite sides of the insulating shoulder 95, abut the ends of 92 and 94, respectively, and a flexible sleeve 98, of rubber tubing for example, held in place by means of suitable retaining bands or strips 99 of any suitable material, encloses the assemblage and completes the reinforced offtake construction.

In assembling the described connection, the steel reinforcing tubes 96, 97, are driven on over the opposite ends of the hard rubber tube 93 until they abut the separating shoulder 95. Incidentally it may be noted that, instead of using a shouldered hard rubber tube, a tube of uniform outside diameter may be used and a short section of soft rubber tubing or the like interposed between the adjacent ends of the steel reinforcing tubes. In either case, the soft rubber sleeve 98 is then drawn on over the assemblage. At the ends, the rubber sleeve is turned back on itself to permit the ends of the hard rubber tube 93 to be driven tightly into the nipple 92, 94; after which the rubber sleeve ends are drawn back over the joints and fastened by the retaining bands 99.

It will be seen that the relatively long non-conducting passage provided by the hard rubber tube 93 represents the minimum distance between the exposed metal parts of the intake 58 and the manifold 56. Moreover, the connection is strong and relatively rigid, being far more permanent and otherwise satisfactory in character than the ordinary rubber hose connections sometimes employed.

The diaphragms are most desirably provided with a border or frame of some kind that will serve to prevent capillary seepage of the electrolyte, usually a solution of caustic alkali, at the points where the diaphragms are marginally clamped between the flanges of adjacent annular casing members. Within the scope of the invention various expedients may be adopted to accomplish this result. In general, each diaphragm should be supported or reinforced at its marginal portions by relatively non-yielding means such as a metal border, to which the diaphragm may be secured in any suitable manner, as by bolting, riveting, clamping, crimping, or otherwise, said non-yielding means being employed in conjunction with yielding means such as rubber, impregnated fabric, etc. placed between the non-yielding border means and the casing member flanges between which the diaphragm is to be clamped. The yielding spacing means may be and usually are of electrically insulated material.

One form which a diaphragm may take within the scope of the invention is illustrated more particularly in Figs. 10, 11 and 12, where the strip 100 of thin sheet metal is bent into a narrow U-shape to cover the margin of the diaphragm and is secured thereto by means of dimples or depressions 101 crimped into the metal of the strip on opposite sides of the diaphragm in staggered arrangement. In order to provide a relatively non-yielding marginal clamping portion for the diaphragm structure, there is employed in this instance a steel filler strip 102 lying in the base of the U-shaped sheet metal member 100 outside of the edges of the asbestos fabric forming the diaphragm proper. When the diaphragms are assembled with the annular casing members, as illustrated generally in Figs. 1 and 2, and more in detail in Fig. 13, a strip of sheet rubber 103 may be folded around and cemented to the armored or reinforced edge of the diaphragm to insulate the same from the casing flanges between which it is clamped; and the remainder of the space between the said flanges is most desirably occupied by a gasket 104 of soft rubber having the proper thickness. Instead of folding a single strip of sheet rubber around the diaphragm edge, I may use two rectangular annular gaskets of sheet rubber, one on each side of the diaphragm margin. When the annular casing members are drawn tightly together by means of the through bolts or other appropriate clamping means, the diaphragms are thus tightly held and insulated from the casing, and the joint between each pair of flanges is effectively packed and rendered liquid tight both by the sheet rubber covering the non-yielding diaphragm border and by the soft rubber packing gaskets 104. In the best embodiment of the invention, these packing gaskets protrude some little distance beyond the outermost edges of the casing flanges, as indicated. This provides a creepage path of exaggerated length, so that in case of any slight leakage of electrolyte through the casing joints in spite of the precautions taken in packing the same, the liability to short circuiting of cells through leakage of electrolyte around the casing flanges and also arcing between casing sections are minimized.

The described construction of the multi-cell unit lends itself particularly well to the application of heat insulation to the exterior of the unit, including the piping connections associated therewith, where such heat insulation is desirable as it sometimes is when operating at high current densities in order to maintain the electrolyte at a high temperature and thereby to keep the internal resistance of the cells as low as possible. In the present instance I have illustrated bodies of heat insulating material 105 in the spaces between the pairs of outwardly projecting casing flanges, such heat insulation having been molded into these spaces in plastic condition, and being removable therefrom when necessary. Similarly, the intake and offtake connections may be, and most desirably are, encased in similar insulation molded to proper form.

The employment of annular cell frames having oppositely extending flanges, as in the embodiment of the invention here illustrated, has the great practical advantage that the rows of bolts by which the pairs of cooperating inner flanges are individually secured together can be arranged at a radial distance from the horizontal axis of the apparatus different from that at which are arranged the through bolts that tie the series of cells together. This not only increases to a material extent the convenience of assembling, but it also enables as close spacing of the bolts in each row as may be necessary to secure liquid-tightness of the joints.

Another desirable feature characterizing the construction of the invention, whether the two flanges of the annular cell frames project oppositely or both in the same direction from the body portion, is the fact that two cell frames with a cell wall or electrode-supporting plate marginally clamped between them may constitute a structural unit which is readily removable from the complete assemblage, when necessary, with a minimum interruption to operation. As the diaphragms require attention and repair more frequently than do the cell walls, this is a matter of considerable practical importance.

The term "annular", as descriptive of the cell frames, is not intended to be literally understood. In the specification and claims by the word annular is meant, endless, and the cell casing 30 is not to be limited to one of circular form. Each cell casing is, in effect, a short, tubular member of any desired cross section, preferably rectangular.

What I claim is:

1. In electrolytic apparatus, a cell casing comprising a plurality of annular cell frames each having inwardly and outwardly projecting flanges, said frames being assembled with the outer flanges abutting in pairs and the inner flanges abutting in pairs.

2. Electrolytic apparatus comprising a plurality of annular metal frames each having a pair of bearing flanges, said frames assembled with said flanges in cooperating relation, and insulation separating the flanges of adjacent frames.

3. Electrolytic apparatus comprising a plurality of annular frames each having an outwardly projecting flange and an inwardly projecting flange, in combination with cell partition means and diaphragm means, attached to said flanges in alternating arrangement.

4. Electrolytic apparatus comprising a plurality of annular frames each having an outwardly projecting flange and an inwardly projecting flange, assembled with the inwardly projecting flanges adjacent in pairs and the outwardly projecting flanges adjacent in pairs, in combination with cell partitions and diaphragms in alternating arrangement clamped between said pairs of flanges.

5. Electrolytic apparatus comprising a plurality of annular frames each having an outwardly projecting flange and an inwardly projecting flange, assembled with the inwardly projecting flanges adjacent in pairs and the outwardly projecting flanges adjacent in pairs, in combination with cell partitions each marginally held between a pair of said inwardly projecting flanges, and diaphragms each marginally held between a pair of said outwardly projecting flanges.

6. Electrolytic apparatus comprising, in combination, a plurality of annular cell frames each having an outwardly projecting flange and an inwardly projecting flange, such outwardly and inwardly projecting flanges cooperating, respectively, in two sets of pairs when the cell frames are assembled, a cell partition marginally clamped between each pair of flanges in one set, a diaphragm marginally clamped between each pair of flanges in the other set, and means for separately securing together the flanges of the pairs in both sets.

7. Electric apparatus comprising, a unit having two annular cell casing members each having two flanges, an electrode structure supported by two of said flanges, one flange of each member cooperating to hold the electrode structure, the remaining flanges being adapted to cooperate with similar flanges of corresponding units in forming a cell casing.

8. Electrolytic apparatus comprising a plurality of annular frames each having an outwardly projecting flange and an inwardly projecting flange, in combination with electrode-supporting cell walls and diaphragms held in alternating arrangement by successive cooperating pairs of said flanges.

9. Electrolytic apparatus comprising a plurality of annular frames each having an outwardly projecting flange and an inwardly projecting flange, assembled with the inwardly projecting flanges adjacent in pairs and the outwardly projecting flanges adjacent in pairs, in combination with electrode-supporting cell walls each marginally held between a pair of said inwardly projecting flanges, and diaphragms each marginally held between a pair of said outwardly projecting flanges.

10. In an electrolytic cell, the combination of flanged annular spacing means composed of relatively thin metal, an impervious wall member closing one side of the space peripherally bounded by said annular spacing means, and a pervious wall member closing the opposite side of said space.

11. In an electrolytic cell, the combination of flanged annular spacing means composed of relatively thin metal, an impervious wall member closing one side of the space peripherally bounded by said annular spacing means, an electrode mounted on said wall member, and a porous diaphragm closing the opposite side of said space.

12. In an electrolyte cell, the combination of flanged annular spacing means composed of relatively thin metal, a plane impervious plate or sheet-like member secured to the flange on one side of said spacing means and closing that side of the space peripherally bounded by said spacing means, electrode means mounted on said plate or sheet like member, a porous diaphragm closing the opposite side of said space, and insulating and packing means interposed between said flanges and the cooperating plate and diaphragm.

13. A unipolar electrode structure comprising a plate or sheet-like member, a flanged annular spacing member of relatively thin metal having its flange secured to the margin of said plate on one side thereof, electrode means mounted on said plate on the same side as said annular member, and insulating and packing means interposed between said flange and plate.

14. A bipolar electrode structure comprising a plate or sheet-like member, a pair of flanged annular spacing members of relatively thin metal secured by their flanges to opposite sides of said plate adjacent the margin thereof, electrode means mounted on both sides of said plate and metallically connected to each other, and insulating and packing means interposed between said plate and said flanges.

15. Electrolytic apparatus comprising, in combination, a plurality of flanged annular frames, said frames being arranged so that the flanges thereof cooperate in clamping pairs, members separating successive clamping pairs, and means extending through said pairs and members to hold the assemblage together.

16. Electrolytic apparatus, comprising flanged annular cell frames assembled to provide a casing, the frame flanges cooperating in successive pairs to form joints, collars interposed between said successive pairs of flanges, and bolts passing through said flanges and collars.

17. Electrolytic apparatus, comprising flanged annular cell frames assembled to provide a casing, the frame flanges cooperating in successive pairs to form joints, axially alined collars interposed between said successive pairs of flanges, there being alined openings in the flanges, and bolts passing through said openings and collars.

18. A diaphragm structure comprising a flat body of pervious material having its periphery and adjacent marginal portions on both sides covered by metal.

19. A diaphragm structure comprising a sheet of asbestos fabric, and a stiffening border therefor comprising a strip of sheet metal folded around the edges of the asbestos fabric and crimped thereto.

20. The combination, with two cell frames having cooperating bearing surfaces, of a diaphragm structure having a substantially non-yielding border clamped between said bearing surfaces.

21. In electrolytic apparatus, the combination, with a closed cell, of an electrolyte intake and an electrolyte offtake, both entering the upper part of the cell.

22. In electrolytic apparatus, the combination, with a cell, of an electrolyte intake and an electrolyte offtake, both entering the upper part of the cell, the intake extending down inside the cell to near the bottom thereof.

23. In electrolytic apparatus, the combination, with a cell having electrode means therein, of an electrolyte intake and offtake, both entering the upper part of the cell, the intake extending down inside the cell and passing horizontally below and adjacent to said electrode means, the horizontal portion of said intake being apertured.

24. In electrolytic apparatus, an annular casing member comprising a tubular portion which is intermediate flanges extending oppositely therefrom.

25. In electrolytic apparatus, an annular casing member comprising a tubular portion which is intermediate flanges extending oppositely therefrom and substantially at right angles thereto.

26. In electrolytic apparatus, an annular casing member comprising a tubular portion which is intermediate flanges extending oppositely therefrom, said tubular portion being apertured for passage of gas and electrolyte.

27. In electrolytic apparatus, an annular casing member, there being a conduit entering the top of the casing to form an electrolyte offtake, and a conduit extending from above the top of the casing to deliver electrolyte within and near the bottom of the casing.

28. In electrolytic apparatus, an annular frame member, in combination with a conduit passing through the periphery of said member and continuing along an inner edge thereof, said conduit being secured to said member.

29. In electrolytic apparatus, a substantially rectangular annular frame member, in combination with a conduit passing through the periphery of said member at one end, continuing along one side thereof to adjacent the other end, and then continuing along the opposite end, this latter portion being provided with discharge openings.

30. In electrolytic apparatus, a conduit for gas or electrolyte comprising an insulating tube, reinforcing means surrounding said tube, and a sleeve surrounding both the tube and reinforcing means.

31. In electrolytic apparatus, a conduit for gas or electrolyte comprising an insulating tube provided with an external spacing member, metal reinforcing tubes enclosing said insulating tube but spaced apart by said member, and a flexible sleeve covering said metal tubes.

32. In electrolytic apparatus, the combination, with two separated pipe terminals, of a pipe connection between them comprising an inner insulating tube, metal reinforcing means surrounding said tube but arranged to maintain a non-conducting gap between said pipe terminals, and a sleeve surrounding the reinforced tube.

33. In electrolytic apparatus, the combination, with a closed cell comprising an annular cell frame having two flanges, of a conduit secured to and passing through said frame transversely of its axis and intermediate said flanges.

34. In electrolytic apparatus, the combination, with a closed cell comprising an annular cell frame, of conduit means secured to and passing through the upper side of said frame transversely of its axis, a part of said conduit means opening into the upper portion of the space bounded by said frame, and another and separate part opening with the lower portion of said space.

In testimony whereof I hereunto affix my signature.

WILLIAM G. ALLAN.